J. B. Forissier.
Ore Amalgamator.
Nº 66,142.   Patented Jun. 25, 1867.

Witnesses.                                   Inventor.

United States Patent Office.

J. B. FORISSIER, OF NEW YORK, N. Y.

Letters Patent No. 66,142, dated June 25, 1867.

---

IMPROVED AMALGAMATOR.

---

*The Schedule referred to in these Letters Patent and making part of the same.*

---

TO ALL WHOM IT MAY CONCERN:

Be it known that I, J. B. FORISSIER, of the city, county, and State of New York, have invented a new and improved Amalgamator; and I do hereby declare that the following is a full, clear, and exact description thereof, which will enable others skilled in the art to make and use the same, reference being had to the accompanying drawings forming a part of this specification, in which—

Similar letters of reference indicate corresponding parts.

This invention relates to an amalgamating apparatus in which several baths of mercury are employed in order to obtain a large area of amalgamation. This object is obtained by arranging in an upright cylinder a series of stationary annular pans, between which a series of revolving annular pans is arranged, each of the pans containing mercury, and the water with the ore falling from one pan to another. The water falls alternately from the centre of the stationary pans and from the circumference of the revolving pans upon the pan below, thus passing in zigzag line from top to bottom of the apparatus, and comes in contact with the whole surface of the mercury in each pan, thereby striking a larger area of mercury than is done by any apparatus now made. The contents of the pans are well stirred by the use of rakes or stirrers arranged at the under side of each pan.

Figure 1:
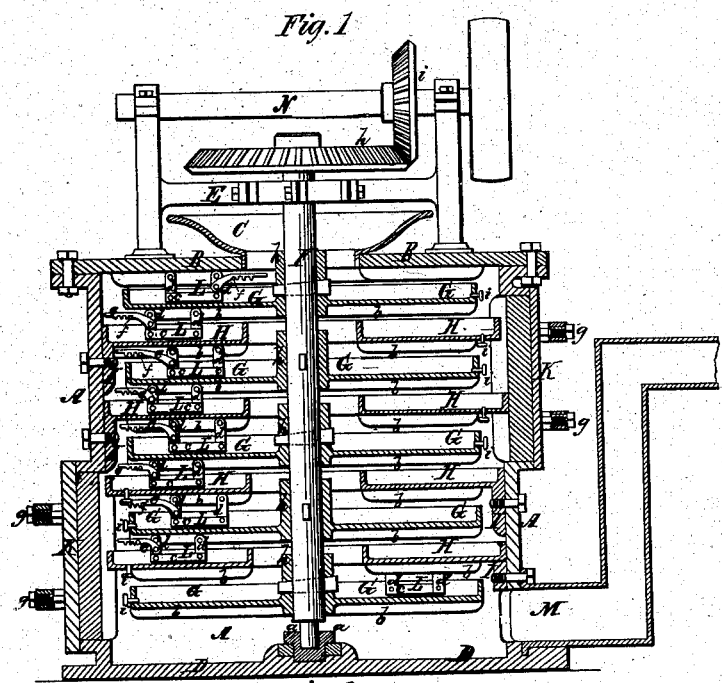
Figure 1 is a vertical section of my improved amalgamator.
Figure 2:
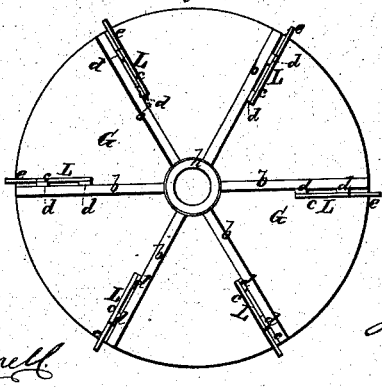
Figure 2 is a bottom view of one of the revolving pans therein arranged.

A represents an upright cylindrical case, made of cast iron, or any other suitable material, and provided with flanges for securing the heads, and for two doors at the sides, and for the orifice of the discharge near the bottom. At the top of this cylinder is firmly secured by bolts an annular plate, B, around the centre of which a circular hopper, C, is either cast or bolted, as shown. At the bottom of the vessel A is secured a head, D, in any suitable manner. A block-step, $a$, is arranged in the centre of plate D, and a frame, E, on top of plate B, in which a vertical shaft, F, passing up through the centre of the vessel A, is held. A bevel-wheel, $h$, on top of shaft F, meshing into a bevel-wheel, $i$, on the horizontal driving-shaft N, or any other kind of gearing or suitable device, serves to impart rotary motion to the shaft F. To the latter, are within the cylinder A, keyed or otherwise secured at suitable intervals, so as to revolve with the said shaft, circular pans G, made of suitable material, their diameter being smaller than that of the cylinder, so that the water may flow over their outer edges. These pans are provided with sockets $h$, that fit around the shaft F, as shown. Between every two pans G are arranged in the cylinder stationary annular pans H, which rest upon flanges or rings I, which are bolted or otherwise secured to the inside of the cylinder, as shown. These rings I are not completely circular, as that portion of each of them that is behind the side doors $k\ k$ is cut away to give access through these doors to the pans G, as well as to the pans H. The latter are open in the centre, so that the water can flow over their inner edge into the revolving pans below, as is clearly shown in the drawing. To the under side of each of the pans G and H, are secured six, more or less, radial ribs $b$, to each of which are pivoted stirrers L L, as shown in figs. 1 and 2. These stirrers consist of horizontal plates $c$, each pivoted at its ends to arms $d$, which are pivoted to the ribs $b$, as shown. A toothed lever, $e$, is pivoted to one of the arms $d$, and by placing it over a pin, $f$, fixed in the rib $b$, the depth of the stirrer in the pan below may be regulated. The stirrers secured to the revolving pans reach into the mercury in the stationary pans, and stir it up well, while the mercury in the revolving pans strikes against the stirrers in the stationary pans with the same effect, provided of course that the shaft F is revolving. Plugs $i\ i$ are secured in the bottom of each pan, so that by removing them the mercury may be drawn off. K K are doors, placed over openings in the side of the cylinders, to give access to the pans, and are firmly held in place by means of screws $g$, or otherwise. M is the discharge pipe, arranged slightly above the bottom of the cylinder, so as not to carry off any mercury that may flow over the edge of the pans with the water.

The operation is as follows: The pans G and H are almost filled with mercury, the shaft F is revolved, and water containing the ore is poured into the hopper, and flows thence into the uppermost pan G, then over the outer edge of that into the pan H below, then over the inner edge of that, and so forth, in a zigzag line, thus coming in contact with the whole area of mercury, while the stirrers serve to complete the amalgamation.

Having thus described my invention, what I claim as new, and desire to secure by Letters Patent, is—

1. The arrangement of the circular revolving and annular stationary pans, the same being constructed as described, so that the water containing the ore may fall from top to bottom of the apparatus in a zigzag line, and be thus distributed over the whole surface of the mercury, as set forth.

2. The stirrers L, when secured to the under sides of the pans G and H, and when they are constructed and operated substantially as and for the purpose herein shown and described.

3. An amalgamator made and operating substantially as herein shown and described.

J. B. FORISSIER.

Witnesses:
 ALEX. F. ROBERTS,
 A. M. TANNER.